(12) United States Patent
Fukutomi et al.

(10) Patent No.: US 9,493,050 B2
(45) Date of Patent: Nov. 15, 2016

(54) AIR CONDITIONING SYSTEM FOR VEHICLE

(75) Inventors: Yoshitomo Fukutomi, Saitama (JP); Ryousuke Muraki, Saitama (JP); Tsuneaki Odai, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 692 days.

(21) Appl. No.: 13/464,140

(22) Filed: May 4, 2012

(65) Prior Publication Data

US 2012/0295529 A1 Nov. 22, 2012

(30) Foreign Application Priority Data

May 20, 2011 (JP) ................................. 2011-113415

(51) Int. Cl.
*B60H 1/34* (2006.01)
*B60H 1/00* (2006.01)

(52) U.S. Cl.
CPC ........ *B60H 1/0005* (2013.01); *B60H 1/00842* (2013.01); *B60H 2001/002* (2013.01); *B60H 2001/00099* (2013.01)

(58) Field of Classification Search
CPC .......................... B60H 1/0005; B60H 1/00842
USPC ........................................................ 454/152
See application file for complete search history.

(56) References Cited

U.S. PATENT DOCUMENTS

| | | | | |
|---|---|---|---|---|
| 5,167,129 A | * | 12/1992 | Akasaka | ....................... 454/144 |
| 5,803,166 A | * | 9/1998 | Ito | ....................... B60H 1/00057 |
| | | | | 165/203 |
| 6,415,851 B1 | * | 7/2002 | Hall et al. | ....................... 454/152 |
| 6,915,650 B2 | * | 7/2005 | Ito | ....................... B60H 1/00064 |
| | | | | 454/75 |
| 2006/0201174 A1 | * | 9/2006 | Marshall et al. | ............... 62/186 |
| 2008/0035322 A1 | | 2/2008 | Klein | |
| 2008/0073057 A1 | * | 3/2008 | Kojima | ....................... B60H 1/00735 |
| | | | | 701/36 |
| 2010/0022178 A1 | * | 1/2010 | Yamaguchi | ....................... B60H 1/00828 |
| | | | | 454/159 |

(Continued)

FOREIGN PATENT DOCUMENTS

| | | |
|---|---|---|
| CN | 1300254 A | 6/2001 |
| CN | 201105629 Y | 8/2008 |
| DE | 10 2007 044 466 | 3/2009 |

(Continued)

OTHER PUBLICATIONS

Walter, et al, DE102007044466 A1 English machine translation, Mar. 19, 2009.*

(Continued)

*Primary Examiner* — Alissa Tompkins
*Assistant Examiner* — Phillip E Decker
(74) *Attorney, Agent, or Firm* — Wenderoth, Lind & Ponack, L.L.P.

(57) ABSTRACT

An air conditioning system for a vehicle includes an air conditioning unit mounted in a front side of the vehicle to condition air in a front seat area, a rear air outlet, a rear duct to connect the air conditioning unit and the rear air outlet, a rear fan provided near the rear air outlet to draw air from the air conditioning unit via the rear duct so that the air is blown from the rear air outlet, an air inlet provided in the rear duct to draw air from a cabin of the vehicle into the rear duct, and a door structure provided at the air inlet to adjust an opening level of either or both of the air inlet and the rear duct so as to adjust an air intake amount from the air conditioning unit and an air intake amount from the air inlet.

9 Claims, 7 Drawing Sheets

(56) References Cited

U.S. PATENT DOCUMENTS

2010/0181061 A1* 7/2010 Ozeki ............... B60H 1/00842
165/200
2012/0252341 A1* 10/2012 Maehata ........... B60H 1/00028
454/75

FOREIGN PATENT DOCUMENTS

| EP | 1 086 837 A1 | | 3/2001 |
|---|---|---|---|
| JP | 04135914 A | * | 5/1992 |
| JP | 9-86138 | | 3/1997 |
| JP | 2000343928 A | * | 12/2000 |
| JP | 2006-240539 | | 9/2006 |
| JP | 2008-81024 | | 4/2008 |
| JP | 2008-528348 | | 7/2008 |
| JP | 2009-184555 | | 8/2009 |
| JP | 2010-76484 | | 4/2010 |

OTHER PUBLICATIONS

Japanese Office Action (OA) issued May 13, 2014 in corresponding Japanese Patent Application No. 2011-113415.

* cited by examiner

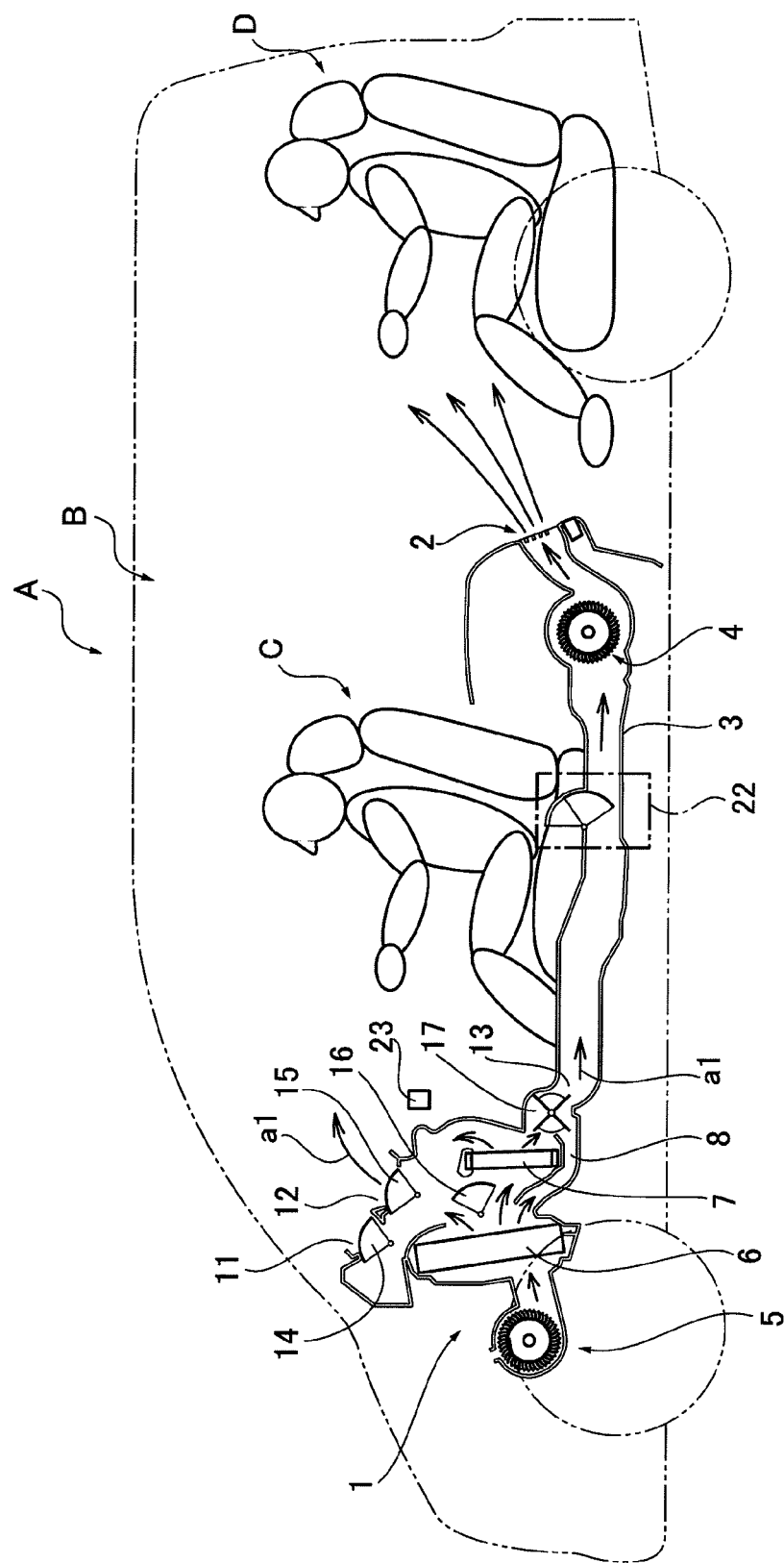

AIR CONDITIONING SYSTEM FOR VEHICLE

CROSS REFERENCE TO RELATED APPLICATION

The present application is based on and claims priority from Japanese Patent Application No. 2011-113415, filed on May 20, 2011, the disclosure of which is hereby incorporated by reference in its entirety.

BACKGROUND OF THE INVENTION

1. Field of the Invention

The present invention relates to an air conditioning system for a vehicle.

2. Description of the Related Art

For example, Japanese Patent Application Publication No. 2010-76484 discloses an air conditioning system for a vehicle which includes an air conditioning unit 1 at the front of a cabin B, a rear air outlet 2, a rear duct 3 connecting between the rear air outlet 2 and the air conditioning unit 1, and a rear fan 4 provided near the rear air outlet 2 to draw air a1 from the air conditioning unit 1, as shown in FIG. 7.

This air conditioning system is configured to generate the air a1 with the air conditioning unit, draw the air by the rear fan 4 to a rear side via the rear duct 3 and blow it to a rear seat area D from the rear air outlet 2 for air conditioning.

The air conditioning unit 1 includes a front fan 5, an evaporator 6, a heater core 7, and a bypass 8 to the heater core 7. It also includes, on the outer surface, an anti-fog air outlet 11 as front and side defoggers, a front air outlet 12, a rear opening 13 connected with the rear duct 3 at the front end, a front air mix door 16 between the evaporator 6 and the heater core 7, and a rear air mix door 17 near the heater core 7 at the exit of the bypass 8. The anti-fog air outlet 11 is provided with an anti-fog door structure 14 while the front air outlet 12 is provided with a front door structure 15.

Such an air conditioning system faces a problem that since the absolute air amount of which the air conditioning unit 1 can supply is limited, the performance of the air conditioning system in the front seat area C may deteriorate when the air a1 is forcibly supplied to the rear seat area D using the rear fan 4.

SUMMARY OF INVENTION

The present invention aims to provide a vehicle air conditioning system which comprises an air inlet at the end of a rear duct provided between an air conditioning unit and a rear air outlet to draw the air from a vehicle cabin into the rear duct, as well as a door structure to adjust the opening level of the air inlet or the rear duct, to be able to adjust the air intake amounts from the air conditioning unit or from the vehicle cabin through the air inlet for blowing the air from the rear air outlet.

According to one aspect of the present invention, an air conditioning system for a vehicle includes an air conditioning unit mounted in a front side of the vehicle to condition air in a front seat area, a rear air outlet, a rear duct to connect the air conditioning unit and the rear air outlet, a rear fan provided near the rear air outlet to draw air from the air conditioning unit via the rear duct so that the air is blown from the rear air outlet, an air inlet provided in the rear duct to draw air from a vehicle cabin into the rear duct, and a door structure provided at the air inlet to adjust an opening level of either or both of the air inlet and the rear duct to adjust an air intake amount from the air conditioning unit and that from the air inlet.

BRIEF DESCRIPTION OF THE DRAWINGS

Features, embodiments, and advantages of the present invention will become apparent from the following detailed description with reference to the accompanying drawings:

FIG. 1 is a cross section view of a vehicle air conditioning system according to one embodiment of the present invention;

DETAILED DESCRIPTION OF PREFERRED EMBODIMENTS

Figure 2A:
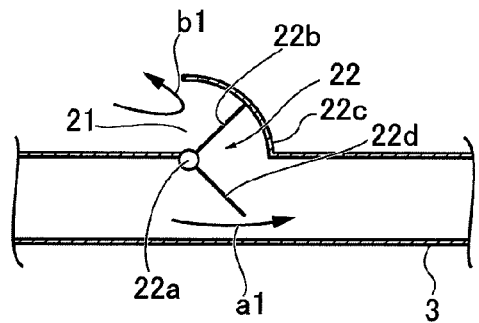
FIGS. 2A to 2E are cross section views of a rear duct with an air inlet and a door structure and show their operation.

Hereinafter, embodiments of the present invention will be described in detail with reference to the accompanying drawings. Wherever possible, the same reference numbers will be used throughout the drawings to refer to the same or like parts.

Referring to FIG. 1, an air conditioning system is mounted in a vehicle A such as an automobile. It includes an air conditioning unit 1 at the front of a cabin B, a rear air outlet 2, a rear duct 3 connecting between the rear air outlet 2 and the air conditioning unit 1, and a rear fan 4 provided near the rear air outlet 2 to draw air a1 from the air conditioning unit 1. This air conditioning system is configured to generate the air a1 with the air conditioning unit at front and supply it to a rear seat area D from the rear air outlet 2 via the rear duct 3 for air conditioning. The basic inner and outer structures of the air conditioning system are almost the same as those in the prior art example, so that a description thereof is omitted.

With reference to FIGS. 2A to 2E, the air conditioning system further includes an air inlet 21 provided at the middle part of the rear duct 3 to draw air b1 from a vehicle cabin B, and a door structure 22 provided at the air inlet 21 to adjust the opening level of either or both of the air inlet 21 and the rear duct 3 to adjust the intake amounts of the air a1 from the air conditioning unit 1 and the air b1 from the vehicle cabin B for blowing the air from the rear air outlet 2.

Preferably, the door structure 22 can adjust the opening level of both of the air inlet 21 and the rear duct 3.

For example, the door structure 22 is comprised of a rotary shaft 22a provided around the air inlet 21 and extending along the width of the rear duct 3 (orthogonal direction relative to the drawings), a first blade 22b to rotate around the shaft 22a inside and outside the rear duct 3 to adjust the opening level of the air inlet 21 and draw the air from the vehicle cabin B, a wall portion 22c at the edge of the air inlet 21 along the trajectory of the end of the first blade 22b to define an area in which the air inlet 21 is closed with the first blade 22b, and a second blade 22d to rotate around the rotary shaft 22a inside the rear duct 3 to adjust the opening level of the rear duct 3.

The wall portion 22c is provided over the range of 90 degrees to define the 90 degree rotation of the second blade 22d from the opening to closing of the rear duct 3. The first blade 22b and second blade 22d are integrally formed to concurrently rotate about the common rotary shaft. Alternatively, the first blade 22b and second blade 22d can be separately rotated about the common rotary shaft or different rotary shafts.

Moreover, according to the present embodiment the air inlet 21 is provided above the rear duct 3, the rotary shaft 22a is attached to the front edge of the air inlet 21, and the wall portion 22c is attached to the back edge thereof. Alternatively, the air inlet 21 can be provided at the side or bottom of the rear duct 3 and the rotary shaft 22a can be provided inside the rear duct 3. In this case a wall portion is additionally provided in a circular form to allow the first blade 22b and second blade 22d to rotate inside the rear duct 3.

The air conditioning system further includes an electronic air conditioning controller 23 in FIG. 1 to automatically control the air conditioning unit 1, rear fan 4, and door structure 22 as above.

When the supply amount of the air conditioning air a1 to the rear seat area D is not sufficient, the air conditioning controller 23 controls the door structure 22 to open the air inlet 21 to draw the air b1 from the vehicle cabin B and blow it from the rear air outlet 2.

Specifically, the air conditioning unit 1 includes various operation modes such as a normal air conditioning mode, an anti-fog mode, an ambient air introduction mode, and an interior air circulation mode. In the normal air conditioning mode the air conditioning air a1 is blown from the front air outlet 12 to condition the air in the front seat area C as shown in FIG. 1. In the anti-fog mode the air a1 is blown from the anti-fog air outlet 11 to a windshield to prevent it from fogging as shown in FIG. 1, and the air a1 is preferentially used for the anti-fog. In the interior air circulation mode the air b1 in the vehicle cabin B is circulated for use in air conditioning, and the air intake amount of the air conditioning unit 1 is limited compared with that in the ambient air introduction mode. In the following specific operations in the respective modes are described.

In the normal air conditioning mode, given an instruction from the controller 23 or an occupant to increase the blow amounts of the air conditioning air a1 to the front seat area C and to the rear seat area D over the capacity of the air conditioning unit 1, the door structure 22 is controlled to open the air inlet 21 to draw the air b1 from the vehicle cabin B.

The blow amounts to the front and rear seat areas C, D which an occupant can manually set are in multiple levels, for example, large (Hi), medium, small (LO). A list of the settings of the relative elements is shown below and the settings correspond to FIG. 2A to 2E.

|   | Front Fan | Rear Fan | Rear Duct | Air Inlet | Rear fan |
|---|---|---|---|---|---|
| 1. | LO | LO | Open (adjustable) | Close | On (50%) |
| 2. | LO | Hi | Open (adjustable) | Close | On (100%) |
| 3. | Hi | Off | Close | Close | Off |
| 4. | Hi | LO | Open (15%) | Close | Off |
| 5. | Hi | Hi | Close or Open small | Open | On (100%) |

In the first and second settings or when the air conditioning unit 1 blows a small amount of air a1 to the front seat area C (fan at LO), it is not necessary to draw the air b1 from the vehicle cabin B by opening the air inlet 21 irrespective of the air blow amount to the rear seat area D since the air a1 is sufficiently supplied to the rear seat area D.

In the third and fourth settings or when the air conditioning unit 1 blows a large amount of air conditioning air a1 to the front seat area C (fan at Hi) but does not blow at all or blows a small amount to the rear seat area D, it is not necessary to draw the air b1 from the vehicle cabin B by opening the air inlet 21 irrespective of the air blow amount to the rear seat area D since the air a1 is sufficiently supplied to the rear seat area D.

However, in the fifth setting or when the air conditioning unit 1 blows a large amount of air a1 to the front seat area C (fan at Hi) so that it cannot deal with an increase in the blow amount to the rear seat area D, the air inlet 21 is opened and draw the air b1 from the vehicle cabin B.

More specifically, referring to FIG. 2A, while the blow amounts to the front and rear seat areas C, D are both small (LO), the rear duct 3 is slightly opened to supply the air a1 to the rear air outlet 2 and the air inlet 21 is closed not to draw the air b1 from the vehicle cabin B. The rear fan 4 is turned on to operate at about 50% to supply a small amount of air a1 to the rear air outlet 2. The opening level of the rear duct 3 can be properly adjusted to an intermediate level. Likewise, the output of the rear fan 4 can be properly adjusted to about 50%.

Figure 2B:
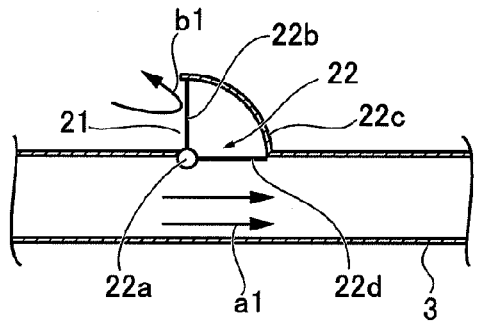

Referring to FIG. 2B, while the blow amount to the front seat area C is small (LO) and that to the rear seat area D is large (Hi), the rear duct 3 is largely opened to supply the air a1 to the rear air outlet 2 and the air inlet 21 is closed not to draw the air b1 from the vehicle cabin B. The rear fan 4 is operated at 100% to draw a large amount of the air a1 into the rear air outlet 2. The rear duct 3 can be properly adjusted to be fully or almost fully opened. Likewise, the output of the rear fan 4 can be properly adjusted to about 100%.

Figure 2C:
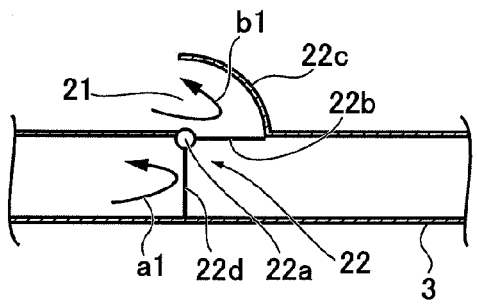

Referring to FIG. 2C, while the blow amount to the front seat area C is small (LO) and that to the rear seat area D is none (Off), the rear duct 3 is closed to stop supplying the air a1 to the rear air outlet 2 and the air inlet 21 is closed not to draw the air b1 from the vehicle cabin B. The rear fan 4 is turned off not to draw the air a1 and the air b1 into the rear air outlet 2.

Figure 2D:
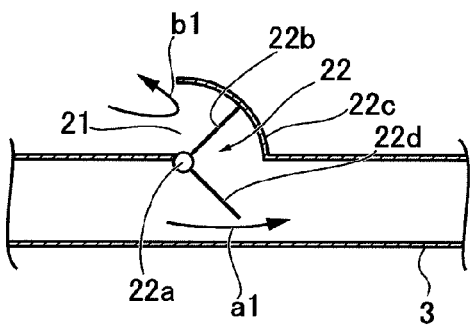

Referring to FIG. 2D, while the blow amount to the front seat area C is large (Hi) and that to the rear seat area D is small (LO), the rear duct 3 is slightly opened at about 15% to supply a very small amount of the air a1 to the rear air outlet 2 and the air inlet 21 is closed not to draw the air b1 from the vehicle cabin B. The rear fan 4 is turned off not to supply the air a1 and the air b1 to the rear air outlet 2. Thereby, the fan of the air conditioning unit 1 provided on the front side supplies a small amount of the air a1 to the rear air outlet 2. The opening level of the rear duct 3 can be properly adjusted to about 15%.

Figure 2E:
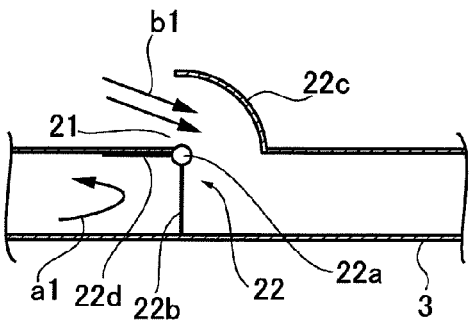

Referring to FIG. 2E, while the blow amounts to the front and rear seat areas C, D are both large (Hi), the rear duct 3 is closed not to supply the air a1 to the rear air outlet 2 so that the air a1 is used only for the front seat area C. The air inlet 21 is opened to draw the air b1 from the vehicle cabin B. The rear fan 4 is operated at 100% to draw a large amount of the air b1 from the vehicle cabin B into the rear air outlet 2, and the rear seat area D is air conditioned with only the air b1 from the vehicle cabin B. The air b1 can effectively air condition the rear seat area D as the air a1 from the air conditioning unit 1. Alternatively, the rear duct 3 can be slightly opened to supply a little amount of the air a1 to the rear air outlet 2 together with the air b1 for air conditioning.

Note that the specific values as 100%, 50%, 15% of the opening level or operation level are merely exemplary and not intended to limit the present embodiment.

Figure 3:
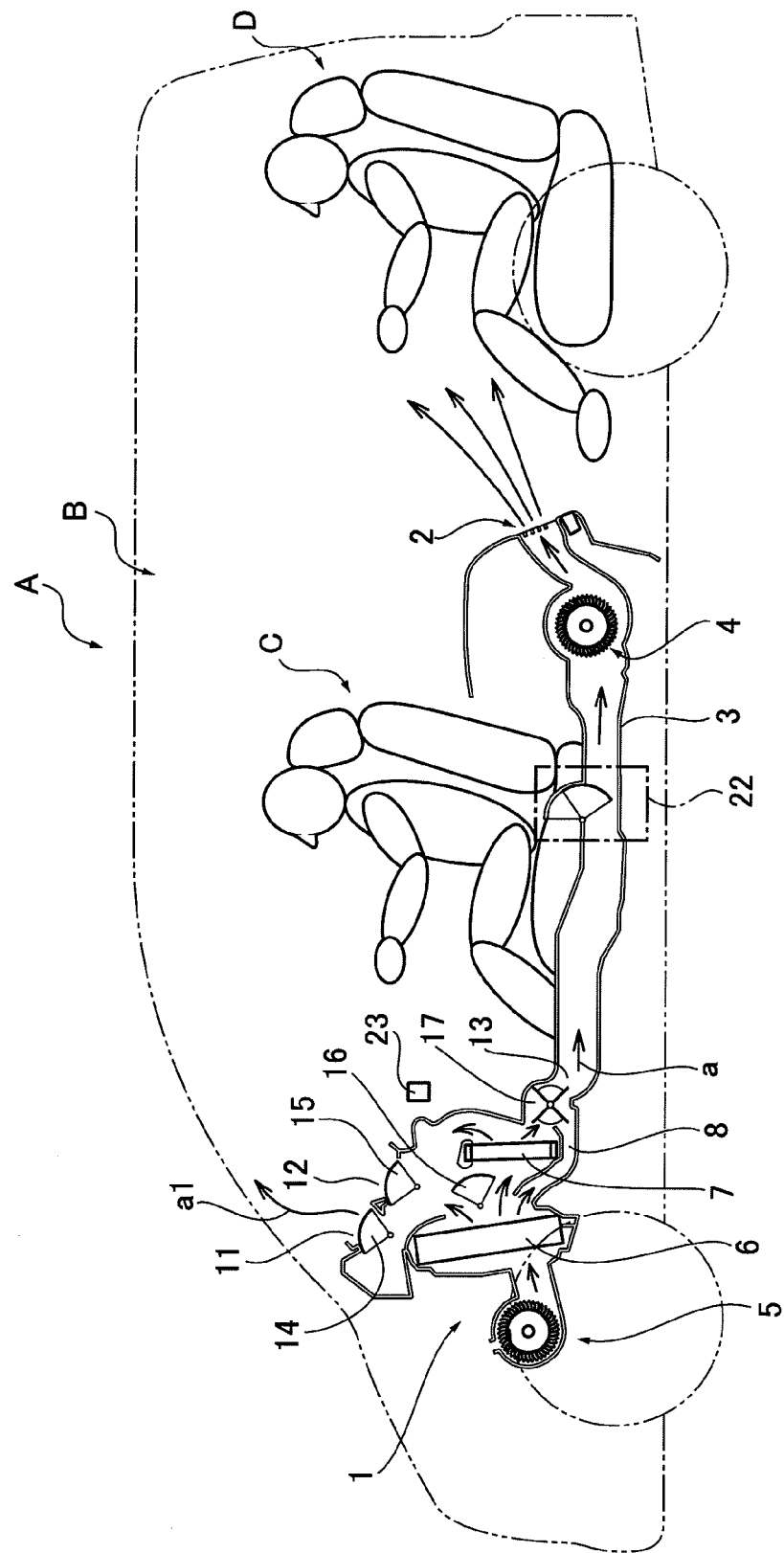
FIG. 3 is a cross section view of the air conditioning system in FIG. 1 during an anti-fog mode.

With reference to FIG. 3, the anti-fog (DEF) mode is described. With the air conditioning unit 1 in the anti-fog mode in which the air a1 is blown from the anti-fog air outlet 11 to the windshield, the door structure 22 is controlled to open the air inlet 21 to draw the air b1 from the vehicle cabin B or/and limit the air blow amount of the rear fan 4 from the rear air outlet 2 to less than the amount instructed or set.

Figure 4:
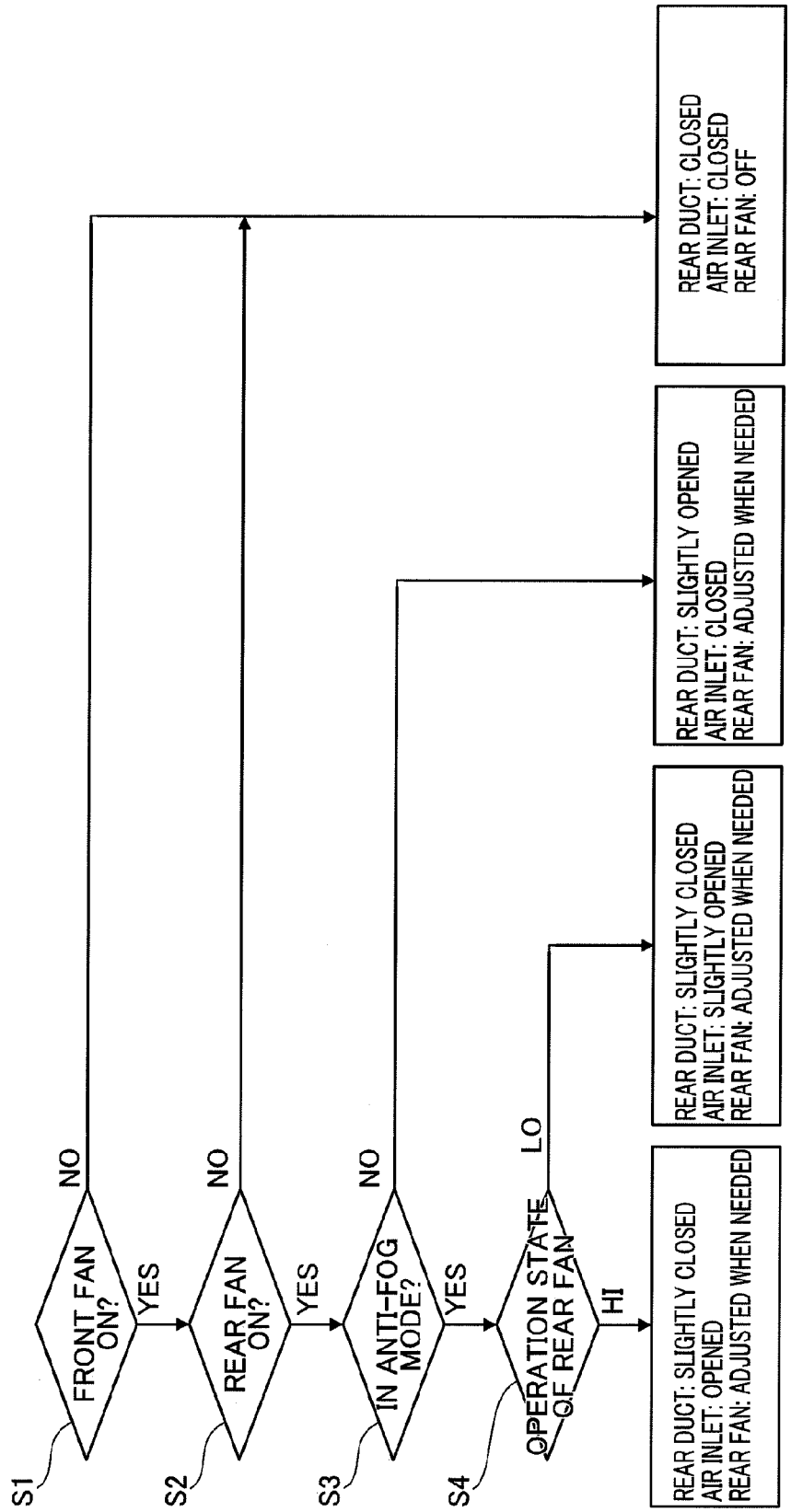
FIG. 4 is a flowchart of the operation in the anti-fog mode.

Specifically, referring to the flowchart in FIG. 4, in step S1 a determination is made on whether or not the front fan 5 of the air conditioning unit 1 is turned on. At the result being No, the door structure 22 is controlled to close the rear duct 3 and open the air inlet 21 and the rear fan 4 is kept turned off. Thus, the rear air outlet 2 blows no air.

At the result being Yes in step S1, a determination is made on whether the rear fan 4 is turned on in step S2. At the result being No in step S2, the door structure 22 is controlled to close both the rear duct 3 and the air inlet 21 and the rear fan 4 is kept turned off. Thus, the rear air outlet 2 blows no air.

When the rear fan 4 is in operation (Yes in step S2), a determination is made on whether the air conditioning unit 1 is in the anti-fog mode in step S3. At the result being No, the door structure 22 is controlled to open the rear duct 3 to a certain degree and close the air inlet 21, and the rear fan 4 is operated when necessary to blow the air 1 from the rear air outlet 2.

At the result being Yes in step S3, the operation status of the rear fan 4 is determined in step S4. With the rear fan 4 in low operation, the door structure 22 is controlled to slightly close the rear duct 3 and slightly open the air inlet 21. The rear fan 4 is operated when necessary. Thereby, the air a1 mixed with the air b1 is blown from the rear air outlet 2. Note that the operation of the rear fan 4 is adjustable in a range depending on the available capacity of the air conditioning unit 1.

Meanwhile, when the rear fan 4 is operated at high level, the door structure 22 is controlled to completely or almost completely close the rear duct 3 and fully or almost fully open the rear air outlet 2. The rear fan 4 can be operated when necessary.

Thereby, the rear air outlet 2 mainly blows the air b1, allowing the air from the air conditioning unit 1 to be preferentially used for anti-fog. The rear duct 3 can be slightly opened to supply a small amount of air a1 to the rear air outlet 2 for air conditioning.

Thus, in the anti-fog mode as in step S4 the operation of the rear fan 4 is limited and/or the rear air outlet 2 is controlled to blow the air b1.

Figure 5:
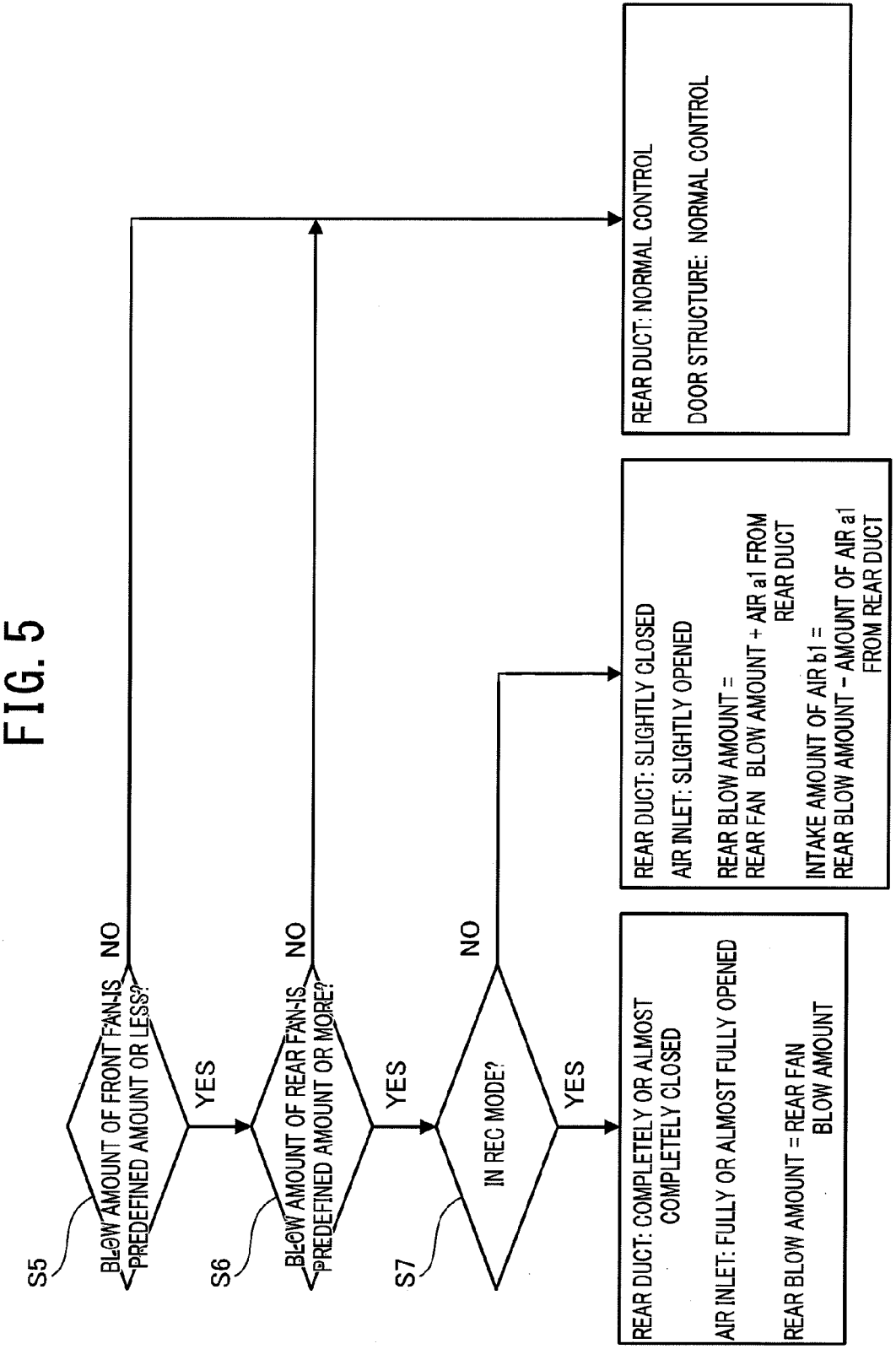
FIG. 5 is a flowchart of the operation in an interior air circulation mode.

Next, the interior air circulation mode of the air conditioning unit 1 in which the air b1 in the vehicle cabin B is circulated for air conditioning is described with reference to FIG. 5. Given an instruction from the controller 23 or an occupant to allow the blow amount of the rear fan 4 from the rear air outlet 2 to be larger than that of the air a1 to the front seat area C, the door structure 22 is controlled to open the air inlet 21 to draw the air b1 from the vehicle cabin B and/or the air blow amount of the rear fan 4 is limited to less than the amount instructed or set.

Specifically, in step S5 a determination is made on whether the blow amount of the front fan of the air conditioning unit 1 is a predefined amount or less. At the result being No, the door structure 22 and the rear fan 4 are normally controlled.

At the result being Yes in step S5, a determination is made on whether the blow amount of the rear fan 4 is a predefined amount or more. At the result being No, the door structure 22 and the rear fan 4 are normally controlled.

At the result being Yes in step S6 that the blow amount of the rear fan 4 is or exceeds a predefined amount, a determination is made on whether the air conditioning unit 1 is in the internal air circulation mode (REC) mode in step S7. With the air conditioning unit 1 being not in REC mode or in ambient air introduction mode, the door structure 22 is controlled to slightly close the rear duct 3 and slightly open the air inlet 21. Thereby, the air blow amount from the rear air outlet 2 becomes equal to a sum of the blow amount of the rear fan 4 and the amount of the air a1 from the front side rear duct 3. Oppositely, the intake amount of the air b1 from the air inlet 21 becomes a difference between the two amounts. Thus, the air inlet 21 is slightly opened to draw the air b1 from the vehicle cabin B and compensate for a shortage of the supply air from the air conditioning unit 1. Thus, the air conditioning air a1 can be sufficiently supplied to both the front and rear seat areas.

In the internal air circulation mode or REC, the door structure 22 is controlled to completely or almost completely close the rear duct 3 and fully or almost fully open the air inlet 21. Therefore, the air blow amount from the rear air outlet 2 coincides with that of the rear fan 4 while the intake amount of the air b1 from the air inlet 21 coincides with the air blow amount of the rear air outlet 2. The air a1 from the air conditioning unit 1 is preferentially used for air conditioning the front seat area C. Alternatively, by slightly opening the rear duct 3, a small amount of the air conditioning air a1 can be mixed with the air b1 for air conditioning. Also, the air blow amount of the rear fan 4 can be restricted.

Thus, in the interior air circulation mode the rear air outlet 2 blows the air or the operation of the rear fan 4 is limited as shown in step S7.

Figure 6:
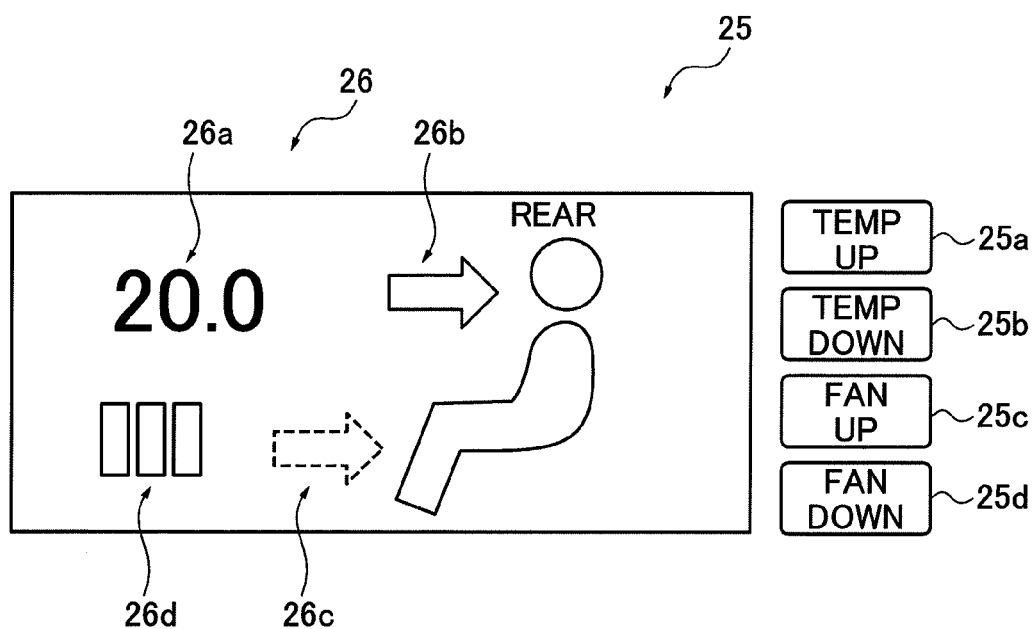
FIG. 6 shows an operation unit of the air conditioning system provided in a rear seat area.
Figure 7:
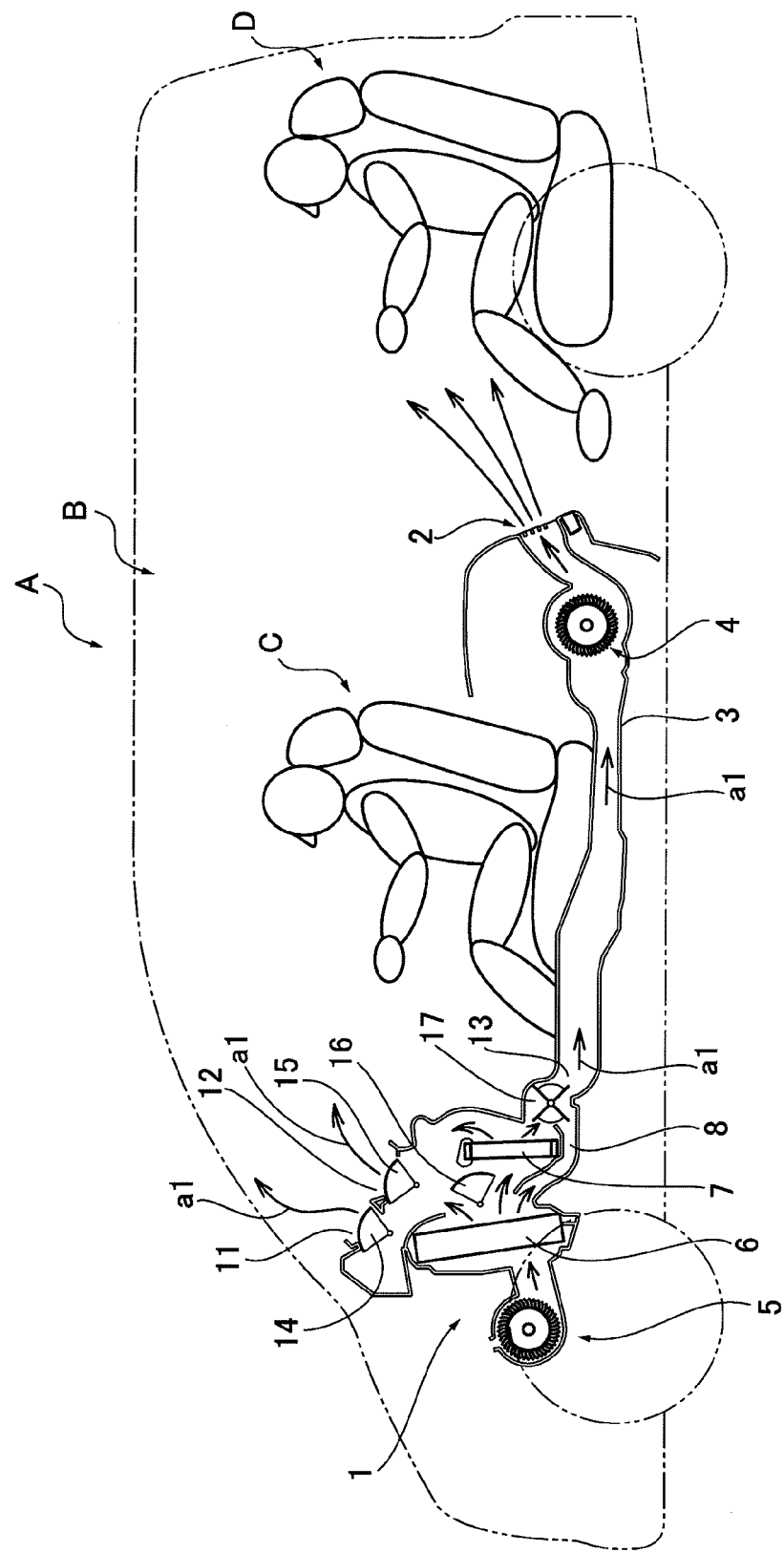
FIG. 7 is a cross section view of an example of a prior art air conditioning system.

Further, the air conditioning system according to the present embodiment includes an operation unit 25 in the rear seat area D. Referring to FIG. 6, the operation unit 25 comprises a temperature up switch (TEMP UP) 25a, a temperature down switch 25b (TEMP DOWN), an air increase switch 25c (FAN UP), an air decrease switch 25d (FAN DOWN), and a display 26.

The display 26 includes a temperature indicator 26a for the rear seat area, arrows 26b, 26c, and a bar element 26d. The arrows 26b, 26c are displayed or not displayed to indicate the air blow position to an occupant on the rear seat, or changed in color or blacked out and whitened to indicate hot air and cold air, for example. The bar element 26d indicates the amount of air. Thus, the display 26 can display various information using text, codes, and graphic.

The display 26 is configured to display a warning that the air conditioning is not sufficient or the air blow amount of the rear air outlet 2 is in shortage while the air inlet 21 is open to draw the air b1 from the vehicle cabin B or the air blow amount of the rear fan 4 is limited.

The warning display can be additionally provided using text, codes or graphics. Alternatively, it can be represented with the above elements, for example, by partially or entirely blinking the elements or changing the colors thereof, or it can be represented by a combination of the above elements and additional elements.

Further, a not-shown operation unit can be provided in the front sear area C to display information as the display 26.

As described above, the air conditioning unit 1 is mainly used for air conditioning the front seat area C. However, the rear seat area D can be also air conditioned with the air a1 from the air conditioning unit 1 by operating the rear fan 4 to draw the air a1 into the rear duct 3 and blow it from the rear air outlet 2.

Moreover, owing to the air inlet 21 and the door structure 22 provided in the middle part of the rear duct 3, it is made possible to adjust the intake amounts of the air a1 from the air conditioning unit 1 and the air b1 from the vehicle cabin B by adjusting the opening level of the air inlet 21 or the rear duct 3. Thereby, the air conditioning performance in the front seat area C can be prevented from degrading.

Further, when the air conditioning unit 1 cannot sufficiently supply the air a1 to the rear seat area D, the door structure 22 is controlled to open the air inlet 21 to draw the air b1 from the vehicle cabin B and blow it from the rear air outlet 2. In this manner, the rear seat area D can be sufficiently air conditioned without a decrease in the air conditioning level in the front seat area C. Accordingly, comfortability and air conditioning performance in both of the front and rear seat areas C, D can be improved.

Further, upon the air conditioning unit 1's receiving an instruction to increase the blow amount of the air a1 to both of the front and rear seat areas C, D in the normal air conditioning mode, the door structure 22 is controlled to open the air inlet 21 and draw the air b1 from the vehicle cabin B. Thereby, the front and rear seat areas C, D can be concurrently air conditioned.

In the anti-fog mode the door structure 22 is controlled to open the air inlet 21 and draw the air b1 from the vehicle cabin B and/or the air blow amount of the rear fan 4 from the rear air outlet 2 is limited. Thereby, it is possible to preferentially use the air for anti-fog of the windshield while partially using it for air conditioning the rear seat area D.

Given an instruction to allow the air blow amount from the rear air outlet 2 to be larger than that to the front seat area C in the interior air circulation mode, the door structure 22 is controlled to open the air inlet 21 and draw the air b1 from the vehicle cabin B and/or the air blow amount of the rear fan 4 from the rear air outlet 2 is limited. Thereby, in the interior air circulation mode in which the air intake amount of the air conditioning unit 1 is restricted from that in ambient air introduction mode, it is made possible to prevent the front seat area from being placed under negative pressure and suctioning air from the front air outlet.

Further, the air conditioning system according to the present embodiment includes the display 26 in the rear seat area D to be able to notify the occupant of insufficient air conditioning or a shortage of the air blow amount from the rear air outlet 2, when controlling the air inlet 21 to open to draw the air b1 from the vehicle cabin or limiting the air blow amount of the rear fan 4.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An air conditioning system for a vehicle comprising:
    an air conditioning unit mounted in a front side of the vehicle and configured to condition air in a front seat area;
    a rear air outlet;
    a rear duct connecting the air conditioning unit and the rear air outlet;
    a rear fan provided in the rear duct and configured to draw air from the air conditioning unit and blow the air to the rear air outlet;
    an air inlet provided in the rear duct and configured to draw air from a cabin of the vehicle into the rear duct;
    a door structure provided at the air inlet and configured to adjust an opening level of either or both of the air inlet and the rear duct so as to adjust an air intake amount from the air conditioning unit and an air intake amount from the air inlet; and
    an electronic controller configured to control operations of the door structure and the rear fan,
    wherein, in an interior air circulation mode of the air conditioning unit, the electronic controller is configured to, in a state in which an instruction to allow an air blow amount from the rear air outlet to be larger than an air blow amount to the front seat area is given, selectively automatically perform at least one of control the door structure so as to open the air inlet to draw the air from the cabin of the vehicle and control the rear fan to limit the air blow amount from the rear air outlet.

2. An air conditioning system for a vehicle according to claim 1, wherein
    the electronic controller is configured to control the door structure so as to open the air inlet to draw the air from the cabin of the vehicle to blow the air from the rear air outlet in a state in which an air supply amount of the air conditioning unit to a rear seat area is insufficient.

3. An air conditioning system for a vehicle according to claim 1, wherein
    in an air conditioning mode of the air conditioning unit, the electronic controller is configured to control the door structure so as to open the air inlet to draw the air from the cabin of the vehicle.

4. An air conditioning system for a vehicle according to claim 1, wherein
    in an anti-fog mode of the air conditioning unit, the electronic controller is configured to control the door structure so as to open the air inlet to draw the air from the cabin of the vehicle and/or control the rear fan so as to limit an air blow amount from the rear air outlet.

5. An air conditioning system for a vehicle according to claim 1, wherein the door structure comprises a rotary shaft, a first blade, and a second blade.

6. An air conditioning system for a vehicle according to claim 5, wherein the first blade and the second blade are configured to rotate separately.

7. An air conditioning system for a vehicle according to claim 6, wherein the first blade is configured to rotate inside the air inlet and inside the rear duct.

8. An air conditioning system for a vehicle according to claim 5, wherein the first blade is configured to rotate inside the air inlet, and the second blade is configured to rotate inside the rear duct.

9. An air conditioning system for a vehicle according to claim 1, wherein the door structure comprises a first rotary shaft, a first blade configured to rotate around the first rotary shaft, a second rotary shaft, and a second blade configured to rotate around the second rotary shaft.

* * * * *